United States Patent
Kami et al.

(10) Patent No.: US 6,695,932 B2
(45) Date of Patent: Feb. 24, 2004

(54) COLD-ROLLED STEEL SHEET HAVING EXCELLENT STRAIN AGING HARDENING PROPERTIES AND METHOD FOR PRODUCING THE SAME

(75) Inventors: Chikara Kami, Chiba (JP); Akio Tosaka, Chiba (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 10/031,742

(22) PCT Filed: Feb. 14, 2001

(86) PCT No.: PCT/JP01/01002

§ 371 (c)(1),
(2), (4) Date: Jan. 23, 2002

(87) PCT Pub. No.: WO01/92593

PCT Pub. Date: Dec. 6, 2001

(65) Prior Publication Data

US 2003/0047257 A1 Mar. 13, 2003

(30) Foreign Application Priority Data

May 31, 2000 (JP) .......... 2000-162498

(51) Int. Cl.[7] .......... C22C 38/06; C21D 8/02
(52) U.S. Cl. .......... 148/320; 148/603
(58) Field of Search .......... 148/320, 603

(56) References Cited

U.S. PATENT DOCUMENTS 6,063,214 A * 5/2000 Fujinaga et al. .......... 148/603

OTHER PUBLICATIONS

English abstract of Japanese patent 219937A published Aug. 8, 2000.*

* cited by examiner

Primary Examiner—Deborah Yee
(74) Attorney, Agent, or Firm—Piper Rudnick LLP

(57) ABSTRACT

The present invention provides a cold-rolled sheet exhibiting superior strain-aging hardenability which is suitable for use in automobile bodies, and a method for manufacturing the same. In particular, a slab including, by mass, not more than 0.15% carbon, not more than 0.02% Al, and 0.0050% to 0.0250% nitrogen in which Si+Mn/5+10P is adjusted to less than 0.44 and the ratio N/Al is adjusted to not less than 0.3 is hot-rolled at a finish-rolling delivery temperature FDT of not less than 800° C., and then coiled at a temperature of not more than 650° C. Next, after cold-rolling, continuous-annealing at a temperature between the recrystallization temperature and 950° C., primary cooling for cooling to a temperature zone of not more than 500° C., and overaging in the temperature zone of 350° C. to 450° C. for a retention time of not more than 30 seconds are performed to prepare a steel sheet containing not less than 0.0010% of solute nitrogen and having a structure in which the ferrite phase with the grain size of not more than 15 μm is included at a ratio of not less than 90%, the remainder of the structure being the pearlite phase. The resulting steel sheet has superior strain-aging hardenability in which the tensile strength is less than 440 MPa and the yield ratio is less than 70%.

6 Claims, No Drawings

COLD-ROLLED STEEL SHEET HAVING EXCELLENT STRAIN AGING HARDENING PROPERTIES AND METHOD FOR PRODUCING THE SAME

TECHNICAL FIELD

The present invention relates to cold-rolled steel sheets primarily suitable for use in automobile bodies. In particular, the present invention relates to a cold-rolled steel sheet exhibiting a tensile strength (TS) of less than 440 MPa and having superior strain-aging hardenability and to a method for manufacturing the same. While various grades of steel sheets from those suitable for light processing to those suitable for extensive deep drawing are available for the steel sheet for automobile bodies, the cold-rolled steel sheet of the present invention is suitable for use in processes which require relatively low-grade steel sheets with suitable processability. The cold-rolled steel sheets of the present invention are suitable for a wide range of uses from use in relatively light processes such as forming pipes by light bending or roll forming to use in relatively severe drawing. In this invention, the term "steel sheets" includes steel strips.

In the present invention, the statement "superior strain-aging hardenability" means that the deformation stress increment before and after an aging treatment is not less than 80 MPa and that the tensile strength increment before and after the strain aging treatment (predeformation+aging treatment) is not less than 40 MPa, the aging treatment being performed at a temperature of 170° C. held for 20 minutes and being conducted after predeformation at a tensile strain of 5%. The deformation stress increment, which is the difference between the yield strength before the aging treatment and after the aging treatment, is also referred to as a BH increment. The tensile strength increment, which is the difference between the tensile strength before the predeformation and after the aging treatment, is hereinafter represented by $\Delta TS$.

BACKGROUND ART

With current gas-emission regulations concerning global environmental problems, reducing body weight of automobiles has become a matter of vital importance. In order to reduce the body weight of automobiles, increasing the strength of the steel sheets used at a large amount, i.e., applying high-strength steel sheets, and reducing the thickness of the steel sheets are effective.

Unfortunately, steel sheets exhibiting significantly high strength suffer from the following problems during press forming in manufacture of the automobile components:

1. degradation of shape fixability
2. occurrence of cracking and necking during forming due to degraded ductility.

In order to overcome the above problems, steel sheets made from ultra-low carbon steels in which the amount of carbon in the solid-solution state remaining in the final product is controlled within a suitable range is known among cold-rolled steel sheets for use in exterior panels. This type of steel sheet is kept soft during press forming so as to secure shape fixability and ductility. Dent resistance is achieved by increasing the yield stress resulting from a strain-aging hardening phenomenon which occurs during a paint-baking process in which a temperature of 170° C. is held for about 20 minutes. This type of steel sheet having carbon in solid-solution in the steel is soft during press forming. In a paint-baking process subsequent to the press forming process, dislocations caused by press forming are fixed by solute carbon, thereby increasing the yield stress.

In this type of steel sheet, however, the increase in the yield stress caused by strain-aging hardening is kept low in order to prevent stretcher strain during press forming which will cause surface defects. Thus, actual contribution of this steel sheet to weight reduction of the component is small.

In order to reduce the weight of the components, both the increase in the yield stress due to strain aging and the increase in the strength characteristics after progressed deformation are necessary. In other words, an increase in the tensile strength after strain aging is required.

In contrast, for uses where good appearance is not required, a steel sheet in which solute nitrogen is used to improve the bake hardening increment, and a steel sheet in which the bake hardenability is further improved by the composite structure comprising ferrite and martensite have been suggested.

For example, Japanese Unexamined Patent Application Publication No. 60-52528 discloses a hot-rolling process in which a steel containing C: 0.02% to 0.15%, Mn: 0.8% to 3.5%, P: 0.02% to 0.15%, Al: not more than 0.10%, and N: 0.005% to 0.025% is coiled at a temperature of not more than 550° C. and a method for manufacturing a high-strength steel sheet exhibiting good ductility and spot weldability in which controlled-cooling annealing is performed after cold rolling. The steel sheets manufactured by the technology described in Japanese Unexamined Patent Application Publication No. 60-52528 has a mixed structure comprising a phase of low-temperature transformation products mainly including ferrite and martensite and exhibits good ductility. In this steel sheet, strain aging during paint baking caused by deliberately added nitrogen is utilized to obtain high strength.

In the technology described in Japanese Unexamined Patent Application Publication No. 60-52528, the increase in yield strength YS due to strain-aging hardening is large but the increase in the tensile strength TS is small. Moreover, a variation in mechanical characteristics such as a variation in the increase of the yield stress YS is significantly large. Thus, the thickness of the steel sheets cannot be reduced by as much as currently required to reduce the weight of the automobile components.

Japanese Patent Publication No. 5-24979 discloses a bake-hardenable high-tension cold-rolled thin steel sheet having a composition of C: 0.08% to 0.20%, Mn: 1.5% to 3.5% with the balance being Fe and unavoidable impurities. The structure of this steel sheet comprises homogenous bainite containing 5% or less of ferrite, or bainite partially including martensite. The cold-rolled steel sheet disclosed in Japanese Patent Publication No. 5-24979 has a structure primarily including bainite obtained by quenching in the temperature range of 400° C. to 200° C. during cooling step after continuous annealing, the quenching being followed by slow-cooling. The steel sheet attains, through this structure, a high bake-hardening increment which has not been attained before.

In the steel sheet described in above Japanese Patent Publication No. 5-24979, although the yield strength increases after paint-baking and a high degree of bake hardening which has never been achieved before is obtained thereby, the tensile strength is not increased. When applied to components requiring strength, improvements in fatigue resistance and crash resistance after forming cannot be expected. Thus, there is a problem in that the steel sheet cannot be used where high fatigue resistance and crash resistance are required.

Moreover, the conventional steel sheets described above, though excellent in strength when evaluated by simple tensile testing after paint-baking treatment, exhibit a significantly large variation in strength after the steel sheets have been subjected to plastic deformation under actual press conditions. Thus, these steel sheets are not necessarily suitable for the components requiring high reliability.

The present invention aims to overcome the limitations of the above-described related art and to provide a cold-rolled steel sheet exhibiting good formability, stable quality, and superior strain-aging hardenability, the steel sheet having sufficient strength for use in automobile components after the steel sheet is formed into automobile components, thus helping to reduce the weight of automobile bodies. A method for commercially manufacturing the steel sheets at low cost is also provided. The goal of the present invention is to achieve a strain-aging hardenability satisfying an BH increment of 80 MPa or more and ΔTS of 40 MPa or more with the aging conditions being a temperature of 170° C. held for 20 minutes after predeformation at a tensile strain of 5%.

DISCLOSURE OF INVENTION

To achieve these objects, the present inventors have manufactured various steel sheets while varying composition and manufacturing conditions, and examined and evaluated many of their characteristics. As a result, the inventors have found that by using nitrogen, which has not been advantageously used in the field where high processability is required, as a strengthening chemical element, and by effectively making use of a large strain-aging hardening phenomenon caused by this reinforcing chemical element, both improvement in formability and increase in the strength after forming can be easily achieved.

Furthermore, the inventors have found that, in order to fully utilize the strain-aging hardening phenomenon caused by nitrogen, the strain-aging hardening phenomenon should be effectively linked to the paint-baking conditions for automobiles and further to the conditions of heat treatment after forming, and that the hot-rolling conditions, cold-rolling conditions, and cold annealing conditions must be optimized to control the microstructure of the steel sheet and the amount of solute nitrogen to within a predetermined range. The inventors have also found that control of the aluminum (Al) content relative to the nitrogen (N) content in the composition is essential for stable strain-aging hardening using nitrogen. Moreover, the inventors have found that when the microstructure of the steel sheet includes ferrite as the primary phase and has an average grain diameter of not more than 15 $\mu$m, the problem of room-temperature aging encountered in the known art can be overcome, and nitrogen can be fully utilized.

In other words, the inventors have found that if nitrogen is used as the strengthening element, the Al content is controlled in a suitable range corresponding to the N content, and the hot-rolling conditions, the cold-rolling conditions, and the cold annealing conditions are optimized to adjust the microstructure and solute nitrogen, then the resulting steel sheet will exhibit a far superior formability compared to known solid-solution strengthening type C-Mn based steel sheet and precipitation strengthening type steel sheets and will obtain superior strain-aging hardenability which has been absent in these known steel sheets.

The steel sheet of the present invention after paint-baking process exhibits a higher strength as determined by a simple tensile test compared to known steel sheets. The variation in the strength after plastic deformation under the actual pressing conditions is small, and reliable component strength characteristics can be achieved. For example, in the region where a large strain is applied, the thickness is small but degree of hardening is large compared to other regions of the steel sheet, resulting in uniformity evaluated in terms of surcharge, i.e., the sheet thickness multiplied by the strength. Thus, the strength of the component can be stabilized.

Based on the above findings, further examinations have been conducted to complete the present invention.

A first invention provides a cold-rolled steel sheet having superior strain-aging hardenability and exhibiting a tensile strength of less than 440 MPa and a yield ratio YR of less than 70%, the steel sheet comprising, by mass: not more than 0.15% carbon; not more than 0.4% silicon; not more than 2.0% manganese; not more than 0.04% phosphorous; not more than 0.02% sulfur; not more than 0.02% aluminum; and 0.0050% to 0.025% nitrogen, wherein the Si content, the Mn content, and the P content satisfy relationship (1):

$$Si+Mn/5+10P<0.44 \tag{1}$$

where Si, Mn, P represent contents, in terms of percent by mass, of corresponding elements. The ratio N/Al is not less than 0.3, the content of nitrogen in the state of solid solution is not less than 0.0010%, the balance of the composition is Fe and unavoidable impurities. The steel sheet has a structure comprising the ferrite phase and the pearlite phase, the area ratio occupied by the ferrite phase being not less than 90%, the average grain size of the ferrite phase being not more than 15 mm. Preferably, the cold-rolled steel sheet has a thickness of not more than 3.2 mm. Preferably, the first invention further includes at least one group selected from Group a to and Group c below:

Group a: at least one of Cu, Ni, Mo, and Cr, the total content being not more than 1.0%;

Group b: at least one of Nb, Ti, and V, the total content being not more than 0.1%; and Group c: at least one of Ca and REMs, the total content being 0.0010% to 0.010%.

A second invention provides a method for manufacturing a cold-rolled steel sheet having superior strain-aging hardenability and exhibiting a tensile strength of less than 440 MPa and a yield ratio YR of less than 70%, the method comprising:

a hot-rolling process comprising: heating a steel slab to a temperature of not less than 1,000° C., the steel slab comprising, by mass: not more than 0.15% carbon; not more than 0.4% silicon; not more than 2.0% manganese; not more than 0.04% phosphorous; not more than 0.02% sulfur; not more than 0.02% aluminum; and 0.0050% to 0.025% nitrogen, wherein the Si content, the Mn content, and the P content satisfy relationship (1):

$$Si+Mn/5+10P<0.44 \tag{1}$$

where Si, Mn, P represent contents, in terms of percent by mass, of corresponding elements, the ratio N/Al being not less than 0.3; rough-rolling the heated slab into a sheet bar; finish-rolling the sheet bar at a finish-rolling delivery temperature of not less than 800° C.; and coiling the resulting sheet bar at a temperature of not more than 650° C. into a coiled hot-rolled sheet, a cold-rolling process comprising pickling and cold-rolling the resulting hot-rolled sheet to prepare a cold-rolled sheet, and a cold-rolled sheet annealing process comprising: annealing the resulting cold-rolled sheet at a temperature between the recrystallization temperature and 950° C. for a holding time of 10 to 120 seconds; cooling at a cooling rate of 10 to 300° C./s to a temperature zone of not more than 500° C.; and optionally overaging in the temperature zone of 350° C. to 500° C. for a retention time of not less than 20 seconds. These processes are sequentially performed. In the second invention, quenching at a cooling rate of not less than 30° C./s is preferably performed before the coiling and after the finish rolling.

In the second invention, more preferably, temper rolling or leveler processing is performed at an elongation of 1.0% to 15% subsequent to the cold-rolled sheet annealing process.

Moreover, a sheet bar is preferably joined to sheet bars preceding and following that sheet bar between the rough rolling and the finish rolling. In the second invention, either one or both of a sheet bar edge heater for heating the ends the sheet bar in the width direction and a sheet bar heater for heating the ends and entire length of the sheet bar in the longitudinal direction are preferably used between the rough rolling and the finish rolling.

BEST MODE FOR CARRYING OUT THE INVENTION

First, the composition restrictions of the steel sheets of the present invention is explained. Hereinafter, "mass %" is simply represented as "%".

C: Not More Than 0.15%

Carbon (C) increases the strength of the steel sheets. In order for the average grain size of ferrite, which is the essential constituent of the present invention, to be not more than 15 μm and in order to achieve the desired strength, the carbon content is preferably not less than 0.005%. At a carbon content exceeding 0.15%, the proportion of carbides in the steel sheets becomes excessive, formability is degraded due to a degraded ductility, and spot weldability and arc weldability are significantly impaired. From the point of view of formability and weldability, carbon is limited to not more than 0.15%. From the point of view of press formability, the carbon content is preferably not more than 0.08%. For use which requires high ductility, the carbon content is preferably not more than 0.05%.

Si: Not More Than 0.4%

Silicon (Si) is a useful element capable of increasing the strength of the steel sheets without significantly decreasing the ductility of the steel. The Si content is preferably not less than 0.005% in order to obtain such a useful effect. The Si content is suitably adjusted according to the desired strength. On the other hand, silicon significantly raises the transformation point during hot rolling, thereby making it difficult to secure the desired quality and shapes, and adversely affects the appearance of the steel sheet surface, i.e., the surface characteristics, chemical conversion treatability, and the like. In the present invention, the Si content is limited to not more than 0.4%. At a Si content of not more than 0.4%, significant elevation of the transformation point can be inhibited by adjusting the amount of additive manganese, and satisfactory surface characteristics can be securely obtained. For uses where good appearance is specifically required, the Si content is preferably not more than 0.2%.

Mn: Not More Than 2.0%

Manganese (Mn) is effective for preventing hot brittleness and is preferably added corresponding to the sulfur content. Manganese greatly contributes to the making of fine grains which is the essential requirement of the present invention, and is preferably deliberately added to improve the material characteristics. From the point of view of stably fixing sulfur, the Mn content should be not less than 0.2%. Also, manganese increases the strength of the steel sheets. In the case where a relatively high strength is required, the Mn content is preferably not less than 1.2%, and, more preferably, not less than 1.5%. With the Mn content being increased to such levels, the variation in the strain-aging hardenability and in the mechanical characteristics of the steel sheets corresponding to the variation of the manufacturing conditions such as hot rolling conditions can be minimized, thereby effectively stabilizing the quality.

Moreover, manganese brings down the transformation point during hot rolling. When used in combination with silicon, the elevation of the transformation point caused by silicon can be counteracted. Especially in the products with a small sheet thickness, the quality and the shapes are readily changed by the change in the transformation point. Accordingly, the manganese content and the silicon content need to be exactly balanced. In view of the above, M/Si is preferably not less than 3.0.

At a high Mn content exceeding 2.0%, the deformation resistance of the steel sheet at elevated temperatures tends to increase, and the spot weldability and formability of the welded parts tend to degrade. Moreover, since formation of ferrite is inhibited, there tends to be a large decrease in ductility. Accordingly, the Mn content is limited to not more than 2.0%. For uses where high corrosion resistance and formability are required, the Mn content is preferably not more than 1.7%.

P: Not More Than 0.04%

Phosphorous (P) contributes to solid-solution hardening of the steel. The P content is preferably not more than 0.001% to achieve such an effect and is suitably adjusted according to the desired strength. The P content is preferably 0.015% to yield a large increase in the strength by solid-solution hardening. At an excessive P content, the steel becomes brittle and the stretch-flanging processability of the steel sheet is degraded thereby. Since the segregation of phosphorous tends to occur in the steel sheet, the welded parts become brittle. Accordingly, the P content is limited to not more than 0.04%. In the case where the stretch-flanging processability and the toughness of the welded parts are especially important, the P content is preferably not more than 0.02%.

Si, Mn, P: the Range Satisfying Relationship (1):

$$Si + Mn/5 + 10P < 0.44 \tag{1}$$

where Si, Mn, and P represent the contents, in terms of percent by mass, of the corresponding elements.

All of silicon, manganese, and phosphorous increase the strength by solid-solution hardening. Since the structure of the present invention is limited to the structure comprising the ferrite phase and the pearlite phase and the tensile strength is limited to less than 440 MPa, the contents of Si, Mn, and P are limited to the range which satisfies both the above described limitations and relationship (1). With the left side of relationship (1), i.e., $A = Si + Mn/5 + 10P$, being 0.44 or more, the strength is excessively increased, and the desired ductility cannot be obtained. Moreover, degradation in the weldability of the steel and in the appearance of the steel sheet surface will occur.

Although the detailed mechanism is unknown, the aging hardenability is degraded when the value A is 0.44 or more. In order to secure superior strain-aging hardenability, the value A should be less than 0.44.

S: Not More Than 0.02%

Sulfur (S) is present in the steel sheet as an inclusion and causes degradation of ductility and corrosion resistance of the steel sheet. In the present invention, the S content is limited to not more than 0.02%. For use which requires particularly high workablity, the S content is preferably not more than 0.015%. In the case where high level of stretch-flanging processability is required, the S content is preferably not more than 0.008%. In order to suitably maintain the strain-aging hardenability at a high level, the S content is preferably decreased to not more than 0.008%, although the detailed mechanism is unknown.

Al: Not More Than 0.02%

Aluminum (Al) effectively functions as a deoxidizing agent and improves the cleanliness of the steel. Aluminum also contributes to a fine structure in the steel sheet. In the present invention, the Al content is preferably not less than 0.001%. On the other hand, an excessive Al content will degrade the steel sheet surface characteristics. Moreover, the solute nitrogen which is the essential constituent of the present invention is decreased, causing a shortage of solute nitrogen which contributes to the strain-aging hardening phenomenon and variation in the strain-aging hardenability which is the feature of the present invention. In view of the above, in the present invention, the Al content is limited to not more than 0.02%, which is low. From the point of view of stabilizing material characteristics, the Al content is preferably not more than 0.015%.

N: 0.0050% to 0.025%

Nitrogen (N) increases the strength of the steel sheet by solid-solution hardening and strain-aging hardening, and is the most important chemical element in the present invention. Nitrogen also brings down the transformation point of the steel and can be suitably used for rolling of thin plates which is incompatible with a temperature significantly smaller than the transformation point, thereby contributing to stable operations. In the present invention, the N content and the manufacturing conditions are suitably controlled to secure a sufficient amount of solute nitrogen in the cold-rolled products or plating products. This ensures a sufficient increase in the strength (YS and TS) caused by the solid-solution strengthening, and thus strain-aging hardening and the mechanical characteristic requirements of the steel sheet of the present invention, i.e., the bake-hardening increment (BH increment) of not less than 80 MPa and the tensile strength increment ($\Delta$TS) of not less than 40 MPa, can be securely satisfied.

At a N content of less than 0.0050%, the above-described effect of strength increase is not stably achieved. At a N content exceeding 0.025%, the internal defect rate and the surface defect rate of the steel sheet become high. Moreover, fractures frequently occur in the slab during continuous casting. In view of the above, the N content is set in the range of 0.0050% to 0.025%. From the point of view of improving the yield and the stability of the material in the whole manufacture process, the N content is preferably in the range of 0.0070% to 0.020%. The nitrogen will not adversely affect the weldability such as the spot weldability and the arc weldability, if limited within the content range of the present invention.

N in the Solid-Solution State: Not Less Than 0.0010%

In order for the cold-rolled products to securely exhibit sufficient strength and to attain sufficient strain-aging hardening by nitrogen (N), the content (concentration) of the nitrogen in the solid-solution state (also referred to as "solute nitrogen") in the steel sheet must be not less than 0.0010%.

The amount of solute nitrogen is determined by subtracting the amount of precipitated nitrogen from the total amount of nitrogen in the steel. For the method of analyzing the amount of precipitated nitrogen, an electroextraction analysis employing chronoamperometry is effective according to the results of the comparative examination of various analytical methods conducted by the inventors. For the method of dissolving the base steel employed in the extraction analysis, an acid digestion method, a halogen method, and an electrolytic decomposition method are available. The electrolytic method can stably dissolve the base steel without decomposing highly unstable microscope precipitation matters such as carbides and nitrides. An acetylacetone-based electrolyte is used to perform electrolysis at a constant potential. In the present invention, the amount of precipitated nitrogen measured by the chronoamperometry exhibited the best correspondence with the actual component strength.

In view of the above, in the preset invention, the amount of nitrogen in the residue is measured by chemically analyzing the residue extracted by the chronoamperometry and is defined as the amount of precipitated nitrogen.

In order to attain higher BH increments and higher $\Delta$TS, the amount of solute nitrogen is preferably not less than 0.0020% and, for even higher BH increments and $\Delta$TS, not less than 0.0030%.

N/Al (the Ratio of the N Content to the Al Content): Not Less Than 0.3

In order for the solute nitrogen to stably remain in the product at an amount of not less than 0.0010%, restricting the amount of aluminum which firmly fixes nitrogen is necessary. Examination of the steel sheets in which the combination of the N content and Al content are widely varied within the composition ranges of the present invention shows that, in order for the content of the solute nitrogen to be not less than 0.0010% in the cold-rolled products and plating products, N/Al needs to be not less than 0.3 if the Al content is kept as low as not more than 0.02%. In other words, the Al content is restricted to not more than (the N content)/0.3.

In the present invention, in addition to the above-described components, at least one group selected among Group a to Group c below is preferably contained:

Group a: at least one of Cu, Ni, Cr, and Mo, the total content being not more than 1.0%;

Group b: at least one of Nb, Ti, and V, the total content being not more than 0.1%; and Group c: at least one of Ca and REMs, the total content being in the range of 0.0010% to 0.010%.

Elements of Group a: Copper (Cu), nickel (Ni), chromium (Cr) and molybdenum (Mo) contribute to increasing the strength without significantly decreasing the ductility of the steel sheet. Such an effect can be obtained at a Ni content of not less than 0.01%, a Cr content of not less than 0.01%, and a Mo content of not less than 0.01%. They may be used alone or in combination as required. At excessive amounts, the deformation resistance at elevated temperatures increases, thereby degrading the chemical conversion treatability and the surface treatability in a broader sense. Moreover, the welded parts are hardened, thereby degrading the formability thereof. In view of the above, the total content of the element(s) in Group a is preferably not more than 1.0%.

Elements in Group b: Niobium (Nb), titanium (Ti), and vanadium (V) contribute to making fine and homogeneous grains. Such an effect can be attained at a Nb content of not less than 0.002%, a Ti content of not less than 0.002%, and a V content of not less than 0.002%. They may be used alone or in combination as required. At excessive amounts, the deformation resistance at elevated temperatures increases and the chemical conversion treatability and the surface treatability in a broader sense are degraded. In view of the above, the total content of the element(s) in Group b is preferably not more than 0.1%.

Elements in Group c: Calcium (Ca) and rare earth metal elements (REMs) help to control the forms of the inclusions. Especially in the case requiring high stretch-flanging formability, it is preferred that these elements be used alone or in combination as required. At a total content of the element(s) in Group c being less than 0.0010%, the effect of controlling forms of the inclusions is insufficient. On the other hand, when the total content exceeds 0.010%, surface defects become noticeable. In view of the above, the total content of the element(s) in Group c is preferably limited to the range of 0.0010% to 0.010%.

The structure of the steel sheet of the present invention will now be described.

Area Ratio of the Ferrite Phase: Not Less Than 90%

It is intended that the cold-rolled sheet of the present invention be used as the steel sheet for automobiles requiring high processability. In order to secure the required ductility, the structure thereof includes the ferrite phase at an area ratio of not less than 90%. If the area ratio of the ferrite phase is less than 90%, the ductility required as the steel sheet for automobiles having high processability is rarely obtained. Moreover, although the details of the mechanism are unknown, high strain-aging hardenability cannot be stably achieved at an area ratio of the ferrite phase of less than 90%. The other phase not of the ferrite phase is the pearlite phase.

Average Grain Size of the Ferrite Phase: Not More Than 15 $\mu$m

In the present invention, the larger grain size of the grain size calculated from the cross-section image of the structure by a stereometry regulated by ASTM and the nominal grain size obtained from the cross-section image of the structure by the sectioning method regulated by ASTM (for example, see Umemoto et al.: NETSUSHORI, vol. 24 (1984), 334) is selected as the crystal diameter of the present invention.

The cold-rolled steel sheet of the present invention as a product includes a predetermined amount of solute nitrogen. The investigation and examination conducted by the inventors show the strain-aging hardenability significantly varies at an average grain size of the ferrite phase in the ferrite and pearlite structure exceeding 15 $\mu$m even when the amount of solute nitrogen is maintained at a predetermined level. Moreover, degradation of the mechanical characteristics after storage at room temperature is significant. Although the details of the mechanism are not known at the present, one of the causes of the variation in the strain-aging hardenability is assumed to be related to the grain size and is thus relevant to the segregation and precipitation of alloy elements in the grain boundaries and to the effects of the processing and heat treatment. In order to stabilize the strain-aging hardenability, the average grain size of the ferrite phase needs to be not more than 15 $\mu$m. In order to stably increase the bake-hardening increment and $\Delta$TS, the average grain size is preferably not more than 12 $\mu$m.

The cold-rolled steel sheet of the present invention having the above-described composition and structure is excellent in the strain-aging hardenability and exhibits a tensile strength TS of less than 440 MPa.

In regulating the strain-aging hardenability, the prestrain (predeformation) is the important factor. The inventors have studied the effect of the prestrain on the strain-aging hardenability while taking into account types of deformation employed in the steel sheets for automobiles. The inventors have found that the effect of the prestrain can be classified in terms of uniaxially converted strain except for the case of extensive deep drawing. The inventors have also found that in actual components, the uniaxially converted strain exceeds 5% and that the component strength displays good correspondence with the strength obtained after the strain-aging at the prestrain of 5%. Thus, in the present invention, the predeformation in the strain-aging process is performed at a tensile strain of 5%.

The standard condition of the conventional paint-baking process is a temperature of 170° C. held for 20 minutes. In the case where a strain of not less than 5% is applied to the steel sheet of the present invention containing a large amount of solute nitrogen, hardening is achieved even with the moderate (lower temperature) aging treatment. In other words, the conditions of aging can be relaxed. Moreover, generally, heating at a higher temperature and holding the temperature for a longer period of time are effective in attaining higher hardening as long as softening does not occur due to excessive aging.

To be more specific, in the invention steel sheet, the lower limit of the heating temperature which attains remarkable hardening after predeformation is approximately 100° C. No improvement in hardening is observed at a heating temperature exceeding 300° C. At a temperature exceeding 400° C., the steel sheet tends to soften, and occurrence of distortion due to heat and temper color become noticeable. For the holding time, sufficient hardening is attained at a heating temperature of approximately 200° C. held for 30 seconds in many cases. For more stable hardening, the holding time is preferably not less than 60 seconds. At a holding time exceeding 20 minutes, no further improvement in hardening is observed, but the production efficiency is significantly impaired as to be impracticable.

In view of the above, in the present invention, conventional paint-baking process conditions wherein the heating temperature of 170° C. is held for 20 minutes are employed as the aging condition for evaluation. The invention steel sheet stably attains a large degree of hardening under aging conditions of low-temperature heating and shorter holding time where no conventional steel sheet for paint-baking attains a sufficient degree of hardening. No limit is imposed as to the heating method. Examples of the preferred heating method are heating in air using a heater for standard paint-baking, induction heating, nonoxidation heating, laser heating, and plasma heating.

The automobile components need to have sufficient strength for resisting complex stress loads from the outside. Accordingly, both the strength characteristics of the low strain zone and the strength characteristics of the high strain zone are important in the material steel sheet. In view of the above, the inventors have determined that the invention steel sheet as the material for the automobile components has a BH increment of not less than 80 MPa and $\Delta$TS of not less than 40 MPa Preferably, the BH increment is not less than 100 MPa and $\Delta$TS is not less than 50 MPa. In order to improve the BH increment and $\Delta$TS, the heating temperature during aging may be increased, and/or the holding time may be longer.

The invention steel sheet before forming will not deteriorate by aging (a phenomenon in which YS is increased and El, i.e., elongation, is decreased) after being left to stand in room temperature for approximately a year. This is a distinct advantage of the present invention not achieved in known art.

The effects of the present invention may be displayed in the steel sheet having a relatively large product sheet thickness At a product sheet thickness exceeding 3.2 mm, however, an appropriate cooling rate cannot be maintained during cold-rolled sheet annealing process, strain aging occurs during continuous casting, and a target strain-aging hardenability as a product is barely attained. Thus, the thickness of the invention steel sheet is preferably not more than 3.2 mm.

In the present invention, electroplating or hot-dip plating may be performed on the surface of the invention cold-rolled steel sheet described above. The resulting plated steel sheet will exhibit the same degree of TS, BH increment, and $\Delta$TS. Examples of suitable plating are electrogalvanizing, hot-dip galvanizing, alloying hot-dip galvanizing, hot-dip aluminum plating, electric tin plating, electric chromium plating, and electric nickel plating.

A method for manufacturing the invention steel sheet will now be described.

The invention steel sheet is manufactured essentially by sequentially performing: a hot-rolling process of making a hot-rolled sheet, the process including rough-rolling a heated steel slab having the above-described composition to make a sheet bar, finish-rolling the resulting sheet bar, and coiling the sheet bar; a cold-rolling process of making a cold-rolled sheet, the process including pickling and cold-rolling the hot-rolled sheet; and a cold-rolled sheet annealing process including continuous casting and aging the cold-rolled sheet.

The slab employed in the invention manufacturing method is preferably made by means of continuous casting so as to prevent macro segregation of the components. Alternatively, ingot-making method or thin-slab continuous casting method may be used. The present invention may be applied to a standard process of cooling the prepared slab to room temperature and reheating the slab, and to a energy-saving process such as direct rolling in which a hot slab is inserted to a heating furnace without cooling or is directly rolled after a brief period of heat insulation. The direct rolling is especially useful to effectively secure solute nitrogen since precipitation of nitrogen is delayed in this process.

First, restrictions on the hot-rolling process conditions are explained.

Slab Heating Temperature: Not Less Than 1,000° C.

The slab heating temperature is preferably not less than 1,000° C. to secure a necessary and sufficient amount of solute nitrogen at the initial stage and to satisfy the target amount of solute nitrogen, i.e., not less than 0.0010%, in the final product. From the point of view of preventing an increase in loss caused by an increase in the oxidation weight, the slab heating temperature is preferably not more than 1,280° C. The slab heated under the above-described conditions is made into a sheet bar by rough rolling. Rough rolling may be performed under standard known conditions, i.e., no special restrictions are imposed. A shorter processing time is preferred to secure the required amount of solute nitrogen.

Next, the sheet bar is finish-rolled to prepare a hot-rolled sheet.

In the present invention, between rough rolling and finish rolling, a sheet bar is preferably joined to other sheet bars preceding and following that sheet bar to allow continuous finish rolling. Examples of the preferable joining method are pressure welding, laser welding, and electron beam welding.

This will reduce the ratio occupied by nonstationary parts, i.e., the front tip and the rear tip of the workpiece, which tend to display irregularities in their shapes during finish rolling and the subsequent cooling, will increase the stable rolling length, i.e., the continuous length up to which the same rolling conditions can be used, and the stable cooling length, i.e., the continuous length up to which cooling can be performed under application of tension, and will improve yield and the accuracy of shapes and dimensions. Moreover, lubricating rolling of a thin and wide strip, which has been difficult to perform due to poor rolling and biting characteristics according to a known rolling in which rolling is performed sheet by sheet, can be performed. Thus, the rolling load and the roller surface pressure are reduced, thereby extending the life of the rollers.

In the present invention, preferably, either one or both of a sheet bar edge heater for heating the ends of the sheet bar in the width direction and a sheet bar heater for heating the ends of the sheet bar in the longitudinal direction are used between rough rolling and finish rolling in order to make the temperature distribution in the width direction and the longitudinal direction of the sheet bar uniform. In this manner, the variation in the material characteristics will be further decreased. The sheet bar edge heater and the sheet bar heater are preferably of an induction-heating type to achieve stable operation.

In operation, the temperature difference in the width direction is preferably corrected first using the sheet bar edge heater. At this time, the heater is preferably adjusted such that the temperature distribution range in the width direction is not more than approximately 20° C. at the exit of finish rolling, although the adjustment may differ depending on the composition of the steel. The temperature difference in the longitudinal direction is then adjusted using the sheet bar heater. At this time, the heater is preferably adjusted such that the temperature at the ends in the longitudinal direction is 20° C. to 40° C. higher than the temperature of the center portion.

Finish-Rolling Delivery Temperature: Not Less Than 800° C.

The temperature FDT at the delivery of the finish rolling is set at not less than 800° C. to prepare a steel sheet having a homogeneous and fine structure. At a finish-rolling delivery temperature below 800° C., the structure will become inhomogeneous due to generation of a pearlite band, and a processing structure may remain in some portions. Remaining of the processing structure can be avoided by using higher coiling temperatures. However, at higher coiling temperatures, the grains become coarse, the amount of solute nitrogen decreases, and the mechanical characteristics display larger planar anisotropy. The temperature FDT is preferably not less than 820° C. to further improve the mechanical characteristics.

Cooling After Finish Rolling: Quenching at a Cooling Rate of Not Less Than 30° C./s After Completion of Finish Rolling Air cooling may be performed after finish rolling. Preferably, quenching at an average cooling rate of not less than 30° C./s is performed after finish rolling. Under such conditions, the high temperature range at which AlN precipitate can be quenched to effectively secure nitrogen in the state of solid solution.

Coiling Temperature: Not More Than 650° C.

As the coiling temperature CT decreases, the strength of the steel sheet increases, thereby allowing solute nitrogen to stably remain in the steel sheet. In order to securely improve the strain-aging hardenability, the coiling temperature is preferably not more than 650° C. At a coiling temperature of less than 200° C., the shape of the coiled steel sheet becomes irregular, and the homogeneousness of the material characteristics is impaired, which is not an effect preferred in actual operations. Thus, the coiling temperature is preferably not less than 200° C. In the case where the requirement of the homogeneousness of the material characteristics is tighter, the coiling temperature is preferably not less than 300° C., and more preferably, not less than 400° C.

In this invention, during finish rolling, lubricating rolling may be performed to reduce the hot-rolling load and to eventually stabilize the strain-aging hardenability. The lubricating rolling has an additional effect of making the shapes and the material characteristics of the hot-rolled sheet more homogeneous. The coefficient of friction during lubricating rolling is preferably in the range of 0.25 to 0.10. The combination of the lubricating rolling and the continuous rolling will lead to reliable hot-rolling operations.

The hot-rolled sheet subjected to the above-described hot rolling process is next subjected to a cold-rolling process in which the hot-rolled sheet is subjected to pickling and cold rolling.

Standard known conditions may be employed in pickling, and no special restrictions are imposed. In the case of cold-rolling a significantly thin hot-rolled sheet, a cold-rolling process may be directly performed without pickling.

Standard known conditions may be employed as the cold-rolling conditions, and no special restrictions are imposed. To secure the homogeneous structure, the cold reduction rate is preferably not less than 40%. The cold-rolled sheet is then subjected to a cold-rolled sheet annealing process including the steps of continuous annealing, cooling after soaking, and optional overaging.

Continuous Annealing Temperature: Between the Recrystallization Temperature and 950° C.

The annealing temperature during continuous annealing is set at not less than the recrystallization temperature.

An annealing temperature below the recrystallization temperature will lead to incomplete recrystallization and low ductility, though the strength is satisfactory. Accordingly, the steel sheet will exhibit degraded formability and cannot be employed as the steel sheet for automobiles. Preferably, the continuous annealing temperature is not less than 700° C. in order to further improve formability. On the other hand, a continuous annealing temperature exceeding 950° C. will lead to significant irregularity in the shape of the steel sheet. In view of the above, the continuous annealing temperature is preferably set between the recrystallization temperature and 950° C.

Holding Time at the Continuous Annealing Temperature: 10 to 120 Seconds

The holding time at the continuous annealing temperature is preferably as short as possible in order to achieve a fine structure and the desired amount or more of solute nitrogen. To secure stable operation, the holding time is preferably not less than 10 seconds. At a holding time exceeding 120 seconds, a fine structure is barely obtained and a sufficient amount of solute nitrogen is barely secured. In view of the above, the continuous annealing temperature is preferably held for 10 to 120 seconds.

Cooling After Soaking: at a Cooling Rate of 10 to 300° C./s to a Temperature Zone of Not More Than 500° C.

In continuous annealing, cooling subsequent to soaking is essential for preparing a fine structure and securing a sufficient amount of solute nitrogen. In the present invention, during cooling after soaking, a continuous cooling at a cooling rate of 10 to 300° C./s is performed to a temperature of not higher than 500° C. At a cooling rate lower than 10° C./s, a fine structure is barely obtained and a desired amount or more of solute nitrogen is barely obtained. On the other hand, at a cooling rate exceeding 300° C./s, a large amount of solute carbon remains, the yield strength YS increases, and the elongation El significantly decreases. Moreover, the material characteristics become less homogeneous in the width direction of the steel sheet. If cooling at a cooling rate of 10 to 300° C./s is stopped at a temperature exceeding 500° C., a fine structure cannot be obtained.

Overaging may be performed after the cooling after the soaking. Overaging is not essential, but allows adjusting the amount of solute carbon and the material characteristics such as yield strength and elongation related to the amount of solute carbon. Thus, overaging may be performed if necessary for stabilizing material characteristics.

Overaging: Not Less Than 20 Seconds in the Temperature Zone of 350° C. to 500° C.

By averaging, the amount of solute carbon can be reduced while maintaining the amount of solute nitrogen. Both solute nitrogen and solute carbon are capable of yielding a remarkably high strain-aging hardenability, but room-temperature aging significantly occurs if the amount of solute carbons is large, resulting in degradation in the characteristics such as ductility and processability. In the present invention, solute nitrogen is primarily used to improve the strain-aging hardenability and to yield excellent mechanical characteristics. At an overaging temperature below 350° C., the amount of solute carbon is not sufficiently decreased. At an overaging temperature exceeding 500° C., a fine structure cannot be obtained. The effect of the overaging is not sufficient at an overaging time of less than 20 seconds. In view of the above, the overaging is preferably performed in the temperature range of 350° C. to 500° C. for not less than 20 seconds. The averaging time is preferably not more than 600 seconds considering the line length of the continuous annealing furnace and other restrictions.

In the present invention, leveler processing or temper rolling both at an elongation of 1.5% to 15% may be performed subsequent to the cold-rolled sheet annealing process. By performing temper rolling or leveler processing, free dislocations can be newly introduced, thereby reliably improving the strain-aging hardenability such as a bake hardening increment and tensile strength increment ΔTS. The total elongation is preferably not less than 1.5% in the temper rolling or leveler processing. At an elongation below 1.5%, the yield strength of the steel sheet increases, thereby degrading ductility. The inventors have confirmed that, although temper rolling is different from leveler processing, no significant difference is observed in the effects regarding the strain-aging hardenability of the steel sheet.

The cold-rolled steel sheet of the present invention can be applied to a plating steel sheet on which plating or alloying is performed. The cycle of heating during alloying treatment corresponds to the above-described averaging treatment. Thus, the resulting steel sheet does not deteriorate by room-temperature aging and exhibits a remarkably improved strain-aging hardenability.

EXAMPLES

A melt having the composition shown in Table 1 was prepared by using a converter and was made into a slab by a continuous casting method. The resulting slab was heated under the conditions shown in Table 2, was subjected to rough-rolling to prepare a sheet bar having the thickness shown in Table 2, and was made into a hot-rolled sheet by a hot-rolling process in which finish rolling under the conditions shown in Table 2 was performed. Lubricating rolling was performed during finish rolling in some Examples. A sheet bar after rough rolling was joined to other sheet bars following and preceding that sheet bar at the delivery of the finish rolling by means of fusion-pressure welding in some Examples. The temperature of the sheet bar is adjusted using a sheet bar edge heater for heating the end portions in the width direction of the sheet bar and a sheet bar heater for heating the end portions in the longitudinal direction of the sheet bar, both heaters being of induction-heating type, in some Examples.

The resulting hot-rolled sheet was then subjected to pickling and to a cold-rolling process comprising cold rolling under the conditions shown in Table 2 to prepare a cold-rolled sheet. The resulting cold-rolled sheet was then subjected to a continuous annealing using a continuous annealing furnace under the conditions shown in Table 2. The cold-rolled sheet annealing process was followed by temper rolling. The annealing temperature in continuous annealing was not less than the recrystallization temperature in all cases.

The solute nitrogen content, the microstructure, the tensile characteristics, and the strain-aging hardenability in the resulting cold-rolled annealed sheet were examined.

(1) Examination of the Solute N Content

The content of solute N was determined by subtracting the amount of precipitated N from the total amount of N in the steel obtained by chemical analysis. The amount of precipitated N was determined by an analysis employing the chronoamperometry described above.

(2) Microstructure

A sample piece was obtained from each cold-rolled annealed sheet. A microstructure image of the cross section of the sample piece taken in the direction orthogonal to the rolling direction, i.e., Cross Section C, is obtained using an optical microscope or a scanning electron microscope. The ratio and the type of the structure were examined using an image analyzer.

In determining the grain size of ferrite, the grain size calculated from the structure image of the cross section taken in the direction orthogonal to the rolling direction, i.e., Cross Section C, by a stereometry regulated by ASTM and the nominal grain size calculated by a sectioning method regulated by ASTM were determined, and the larger of the two sizes was employed as the grain size of ferrite.

(3) Tensile Characteristics

A Japanese Industrial Standard (JIS) No.5 sample piece was taken in the rolling direction from each cold-rolled annealed sheet and was subjected to tensile testing according to JIS Z 2241 regulations at an initial tensile rate of $3 \times 10^{-3}$/s (cross-head rate: 10 mm/min, constant) to determine the yield strength YS, the tensile strength TS, and the elongation El.

(4) Strain-Aging Hardenability

A Japanese Industrial Standard (JIS) No.5 sample piece was taken in the rolling direction from each cold-rolled annealed sheet and was subjected to predeformation at a tensile prestrain of 5%. Next, a heating treatment equivalent to a paint-baking process at a temperature of 170° C. held for 20 minutes was performed. Subsequently, a tensile testing was performed at an initial tensile rate of $3 \times 10^{-3}$/s to determine the tensile characteristics after predeformation and paint-baking process, i.e., the yield stress $YS_{BH}$ and the tensile strength $TS_{BH}$ and the BH increment=$YS_{BH}-YS_{5\%}$ and $\Delta TS=TS_{BH}-TS$ were calculated. Here, $YS_{5\%}$ is the deformation stress after pre-deforming the product sheet at 5% prestrain, and $YS_{BH}$ and $TS_{BH}$ are the yield stress and the tensile strength, respectively, after a predeformation-and-paint-baking treatment. The tensile strength of the product sheet is represented by TS.

The results are shown in Table 3.

All of the examples according to the present invention exhibit excellent ductility and superior strain-aging hardenability and display distinctively high BH increments and $\Delta TS$.

INDUSTRIAL APPLICABILITY

According to the present invention, a highly versatile cold-rolled steel sheet exhibiting high strain-aging hardenability and high formability in which the yield stress is increased by 80 MPa and the tensile strength is increased by 40 MPa by predeformation and paint-baking treatment can be manufactured at low cost without irregularities in the shape. Thus, the invention has a remarkable industrial advantage. When the cold-rolled steel sheet of the present invention is applied to automobile components, both the yield stress and the tensile strength can be increased by the paint-baking treatment or the like, and stable characteristics as the components can be achieved. Another advantage is that the sheet thickness of the steel sheet used can be reduced to a thickness of 2.0 mm to 1.6 mm, for example, which is thinner than known sheets, thereby reducing the weight of automobile bodies. Moreover, the present invention has a remarkable industrial advantage of facilitating hot rolling of thin sheets without increasing deformation resistance since the strain-aging hardenability is improved by adding nitrogen which does not significantly increase the deformation resistance at elevated temperatures.

TABLE 1

| Steel No. | Chemical Composition (mass %) | | | | | | | | | Mn/Si | Value A |
|---|---|---|---|---|---|---|---|---|---|---|---|
| | C | Si | Mn | P | S | Al | N | N/Al | Other | | |
| A | 0.05 | 0.10 | 1.2 | 0.002 | 0.0015 | 0.010 | 0.0095 | 0.95 | — | 12 | 0.36 |
| B | 0.03 | 0.20 | 1.0 | 0.002 | 0.0020 | 0.015 | 0.0120 | 0.80 | — | 5 | 0.42 |
| C | 0.12 | 0.20 | 0.8 | 0.001 | 0.0015 | 0.009 | 0.0098 | 1.09 | — | 4 | 0.37 |
| D | 0.03 | 0.10 | 0.9 | 0.002 | 0.0015 | 0.009 | 0.0178 | 1.98 | — | 9 | 0.30 |
| E | 0.05 | 0.02 | 1.5 | 0.001 | 0.0015 | 0.008 | 0.0095 | 1.19 | Mo: 0.10 | 75 | 0.33 |
| F | 0.005 | 0.07 | 1.2 | 0.002 | 0.0015 | 0.010 | 0.0120 | 1.20 | Ca: 0.0035 | 17 | 0.33 |
| G | 0.015 | 0.10 | 1.2 | 0.003 | 0.0021 | 0.007 | 0.0079 | 1.13 | Ti: 0.015 | 12 | 0.37 |
| H | 0.08 | 0.04 | 0.6 | 0.027 | 0.0028 | 0.012 | 0.0110 | 0.92 | Nb: 0.009 | 15 | 0.43 |
| I | 0.05 | 0.10 | 1.1 | 0.003 | 0.0012 | 0.012 | 0.0098 | 0.82 | Ni: 0.07, REM: 0.0070 | 11 | 0.35 |
| J | 0.05 | 0.10 | 1.1 | 0.003 | 0.0022 | 0.021 | 0.0065 | 0.31 | Cu: 0.5, Ni: 0.3 | 11 | 0.35 |
| K | 0.05 | 0.10 | 1.1 | 0.002 | 0.0021 | 0.031 | 0.0025 | 0.08 | — | 11 | 0.34 |
| L | 0.05 | 0.30 | 1.1 | 0.030 | 0.0015 | 0.010 | 0.0095 | 0.95 | — | 3.7 | 0.82 |

*) The left side of relationship (1)

TABLE 2

| Steel Sheet No. | Steel No. | Hot Rolling Process ||||||||
|---|---|---|---|---|---|---|---|---|
| | | Slab Heating Temperature SRT °C | Rough Rolling Sheet Bar Thickness mm | Sheet Bar Welding | Finish Rolling |||Average Cooling Rate After Rolling °C./s | Coiling Temperature CT °C |
| | | | | | Delivery Temperature FDT °C | Hot-Rolled Sheet Thickness mm | | |
| 1 | A | 1200 | 38 | Not Performed | 840 | 2.6* | 50 | 540 |
| 2 | | 1180 | 38 | Performed** | 840 | 2.6 | 35 | 540 |
| 3 | | 1210 | 38 | Performed | 840 | 2.6 | 35 | 720 |
| 4 | B | 1210 | 35 | Not Performed | 855 | 2.6 | 40 | 550 |
| 5 | | 1200 | 38 | Not Performed | 770 | 2.6 | 45 | 555 |
| 6 | C | 1210 | 35 | Performed | 870 | 2.9 | 37 | 600 |
| 7 | D | 1200 | 35 | Performed | 865 | 2.9 | 38 | 600 |
| 8 | E | 1170 | 35 | Performed | 850 | 3.2 | 35 | 600 |
| 9 | F | 1230 | 40 | Not Performed | 880 | 3.2 | 35 | 520 |
| 10 | G | 1220 | 40 | Not Performed | 890 | 2.6 | 35 | 520 |
| 11 | | 1220 | 40 | Not Performed | 880 | 2.6 | 35 | 520 |
| 12 | H | 1190 | 38 | Not Performed | 855 | 2.9 | 55 | 530 |
| 13 | | 1190 | 38 | Not Performed | 858 | 2.9 | 50 | 530 |
| 14 | I | 1200 | 38 | Not Performed | 860 | 2.9 | 35 | 540 |
| 15 | J | 1200 | 38 | Not Performed | 860 | 2.9 | 35 | 540 |
| 16 | K | 1200 | 38 | Not Performed | 865 | 2.9 | 35 | 540 |
| 17 | L | 1200 | 38 | Not Performed | 840 | 2.6 | 50 | 540 |

| Steel Sheet No. | Steel No. | Cold-Rolling Process || Cold-Rolled Sheet Annealing Process |||||| |
|---|---|---|---|---|---|---|---|---|---|
| | | Cold Reduction Rate % | Cold-Rolled Sheet Thickness mm | Continuous Anealing ||Cooling After Soaking ||Overaging Retention Time in the Range of 350–500° C. s | Temper Rolling Elongation % |
| | | | | Annealing Temperature °C. | Holding Time s | Cooling Rate °C./s | Shut Down Temperature °C. | Starting Temperature °C. | |
| 1 | A | 71 | 0.75 | 780 | 60 | 20 | 480 | 480 | 30 | 0.5 |
| 2 | | 71 | 0.75 | 800 | 50 | 20 | 470 | 470 | 40 | 0.5 |
| 3 | | 71 | 0.75 | 880 | 50 | 20 | 490 | 490 | 45 | 0.5 |
| 4 | B | 73 | 0.70 | 800 | 40 | 15 | 450 | 450 | 40 | 0.5 |
| 5 | | 73 | 0.70 | 800 | 40 | 3 | 450 | 450 | 39 | 0.5 |
| 6 | C | 76 | 0.70 | 720 | 40 | 20 | 450 | 450 | 50 | 1.5 |
| 7 | D | 76 | 0.70 | 720 | 40 | 25 | 450 | 450 | 50 | 1.0 |
| 8 | E | 78 | 0.70 | 720 | 40 | 25 | 450 | 450 | 29 | 1.5 |
| 9 | F | 75 | 0.80 | 750 | 50 | 20 | 450 | 450 | 30 | 1.5 |
| 10 | G | 69 | 0.80 | 750 | 40 | 20 | 450 | 450 | 30 | 1.0 |
| 11 | | 69 | 0.80 | 750 | 50 | 30 | 350 | — | — | 1.0 |
| 12 | H | 72 | 0.80 | 730 | 50 | 20 | 440 | 440 | 35 | 3.0 |
| 13 | | 66 | 1.00 | 730 | 50 | 25 | 600 | 600 | 90 | 3.0 |
| 14 | I | 62 | 1.10 | 740 | 50 | 40 | 440 | 440 | 40 | 0.5 |
| 15 | J | 62 | 1.10 | 750 | 50 | 40 | 440 | 440 | 40 | 0.5 |
| 16 | K | 62 | 1.10 | 820 | 50 | 40 | 440 | 440 | 40 | 0.5 |
| 17 | L | 71 | 0.75 | 780 | 60 | 20 | 470 | 470 | 30 | 0.5 |

*Subjected to lubricating rolling
**Sheet bar heater and edge heater were used

TABLE 3

| Steel Sheet No. | Steel No. | Solute N in Steel Sheet MASS % | Steel Sheet Structure ||| Product Sheet Characteristics Tensile Characteristics |||| Characteristics After Predeformation and Paint-Baking || Strain Aging Hardenability BH ||Reference |
|---|---|---|---|---|---|---|---|---|---|---|---|---|---|---|
| | | | Ferrite Area Ratio % | Grain Size μm | Pearlite Area Ratio % | YS MPa | TS MPa | El % | YR % | Value r $r_{mean}$ | YS MPa | TS MPa | Increment MPa | ΔTS MPa | |
| 1 | A | 0.0059 | 98 | 7 | 2 | 260 | 395 | 40 | 66 | 1.1 | 410 | 455 | 95 | 60 | IE |
| 2 | | 0.0050 | 98 | 7 | 2 | 254 | 390 | 41 | 65 | 1.1 | 415 | 452 | 95 | 62 | IE |

TABLE 3-continued

| Steel Sheet No. | Steel No. | Solute N in Steel Sheet MASS % | Steel Sheet Structure | | | Product Sheet Characteristics Tensile Characteristics | | | | Value r $r_{mean}$ | Characteristics After Predeformation and Paint-Baking | | Strain Aging Hardenability BH | | Reference |
|---|---|---|---|---|---|---|---|---|---|---|---|---|---|---|---|
| | | | Ferrite Area Ratio % | Grain Size μm | Pearlite Area Ratio % | YS MPa | TS MPa | El % | YR % | | YS MPa | TS MPa | Increment MPa | ΔTS MPa | |
| 3 | | 0.0007 | 97 | 17 | 3 | 255 | 385 | 34 | 66 | 1.2 | 355 | 410 | 55 | 25 | CE |
| 4 | B | 0.0055 | 99 | 8 | 1 | 257 | 395 | 40 | 65 | 1.1 | 415 | 450 | 98 | 55 | IE |
| 5 | | 0.0007 | 98 | 7 | 2 | 247 | 380 | 36 | 65 | 1.1 | 345 | 400 | 45 | 20 | CE |
| 6 | C | 0.0090 | 96 | 6 | 4 | 285 | 425 | 39 | 67 | 1.0 | 450 | 482 | 90 | 57 | IE |
| 7 | D | 0.0146 | 96 | 6 | 4 | 287 | 435 | 38 | 66 | 1.0 | 475 | 516 | 120 | 81 | IE |
| 8 | E | 0.0079 | 98 | 7 | 2 | 281 | 420 | 40 | 67 | 1.1 | 445 | 479 | 102 | 59 | IE |
| 9 | F | 0.0065 | >99 | 8 | <1 | 231 | 355 | 44 | 65 | 1.4 | 377 | 410 | 90 | 55 | IE |
| 10 | | 0.0059 | >99 | 7 | <1 | 288 | 430 | 38 | 67 | 1.3 | 458 | 489 | 90 | 59 | IE |
| 11 | G | 0.0065 | >99 | 7 | <1 | 290 | 438 | 38 | 66 | 1.3 | 455 | 497 | 85 | 59 | IE |
| 12 | | 0.0055 | 98 | 5 | 2 | 270 | 395 | 41 | 68 | 1.0 | 421 | 457 | 100 | 62 | IE |
| 13 | H | 0.0008 | 98 | 5 | 3 | 260 | 375 | 38 | 69 | 1.1 | 365 | 400 | 40 | 25 | CE |
| 14 | I | 0.0045 | 98 | 6 | 2 | 270 | 405 | 39 | 67 | 1.0 | 421 | 455 | 90 | 50 | IE |
| 15 | J | 0.0048 | 98 | 6 | 2 | 275 | 415 | 39 | 66 | 1.0 | 425 | 460 | 80 | 45 | IE |
| 16 | K | 0.0001 | 98 | 7 | 2 | 251 | 375 | 36 | 67 | 1.0 | 335 | 390 | 30 | 15 | CE |
| 17 | L | 0.0009 | 95 | 10 | 5 | 346 | 480 | 25 | 72 | 1.0 | 430 | 490 | 25 | 10 | CE* |

*degradation of surface characteristics
NOTE:
CE represents Comparative Example
IE represents Example of the present invention

What is claimed is:

1. A cold-rolled steel sheet having superior strain-aging hardenability and exhibiting a tensile strength of less than 440 Mpa and a yield ratio YR of less than 70%, the steel sheet comprising, by mass:

not more than 0.15% carbon;

not more than 0.4% silicon';

not more than 2.0% manganese;

not more than 0.04% phosphorous;

not more than 0.02% sulfur;

greater than 0.005% and not more than 0.02% aluminum; and 0.0050% to 0.025% nitrogen, wherein the silicon content, the manganese content, and the phosphorous content satisfy relationship (1) below:

$$Si+Mn/5+10P<0.44 \quad (1)$$

where Si, Mn, P represent contents, in terms of percent by mass, of corresponding elements, wherein the ratio N/Al is not less than 0.3, the content of nitrogen in the state of solid solution is not less than 0.0010%, the balance of the composition is Fe and unavoidable impurities, and wherein the steel sheet has a structure comprising the ferrite phase and the pearlite phase, the area ratio occupied by the ferrite phase being not less than 90%, the average grain size of the ferrite phase being not more than 15 μm.

2. The cold-rolled steel sheet according to claim 1, further comprising at least one group selected from Group a to Group c below:

Group a: at least one of Cu, Ni, Mo, and Cr, the total content being not more than 1.0%;

Group b: at least one of Nb, Ti, and V, the total content being not more than 0.1%; and Group c: at least one of Ca and REMS, the total content being 0.0010% to 0.010%.

3. A method for manufacturing a cold-rolled steel sheet having superior strain-aging hardenability and exhibiting a tensile strength of less than 440 Mpa and yield ratio YR of less than 70%, the method comprising:

a hot-rolling process comprising: heating a steel slab to a temperature of not less than 1,000° C., the steel slab comprising, by mass:

not more than 0.15% carbon;

not more than 0.4% silicon;

not more than 2.0% manganese;

not more than 0.04% phosphorous;

not more than 0.02% sulfur;

greater than 0.005% and not more than 0.02% aluminum; and 0.0050% to 0.025% nitrogen, wherein the Si content, the Mn content, and the P content satisfy relationship (1): Si+Mn/5+10P<0.44 where Si, Mn, P represent contents, in terms of percent by mass, of corresponding elements, the ratio of N/Al being not less than 0.3; rough-rolling the heated slab into a sheet bar; finish-rolling the sheet bar at a finish-rolling delivery temperature of not less than 800° C.; and coiling the resulting sheet bar at a temperature of not more than 650° C. into a coiled hot-rolled sheet, a cold-rolling process comprising pickling and cold-rolling the resulting hot-rolled sheet to prepare a cold-rolled sheet, and a cold-rolled sheet annealing process comprising: annealing the resulting cold-rolled sheet at a temperature between the recrystallization temperature and 950° C. for a holding time of 10 to 120 seconds; cooling at a cooling rate of 10 to 300° C./s to a temperature zone of not more than 500° C.; and optionally overaging in the temperature zone of 350° C. to 500° C. for a retention time of not less than 20 seconds, wherein the hot-rolling process, the cold-rolling process, and the cold-rolled sheet annealing process are sequentially performed.

4. The method for manufacturing the cold-rolled steel sheet according to claim 3, wherein quenching at a colling rate of not less than 30° C./s is performed before the coiling and after the finish rolling.

5. The method for manufacturing the cold-rolled steel sheet according to claim 3, wherein temper rolling or leveler processing is performed at an elongation of 1.0% to 15% subsequent to the cold-rolled sheet annealing process.

6. The method for manufacturing the cold-rolled steel sheet according to claim 4, wherein temper rolling or leveler processing is performed at an elongation of 1.0% to 15% subsequent to the cold-rolled sheet annealing process.

* * * * *

UNITED STATES PATENT AND TRADEMARK OFFICE
CERTIFICATE OF CORRECTION

PATENT NO. : 6,695,932 B2
DATED : February 24, 2004
INVENTOR(S) : Kami et al.

It is certified that error appears in the above-identified patent and that said Letters Patent is hereby corrected as shown below:

Column 4,
Line 30, please change "15 mm" to -- 15 $\mu$m --.

Signed and Sealed this

Fifth Day of April, 2005

JON W. DUDAS
*Director of the United States Patent and Trademark Office*